United States Patent
Lin et al.

(10) Patent No.: US 8,290,691 B2
(45) Date of Patent: Oct. 16, 2012

(54) METHOD AND APPARATUS FOR OPTIMIZING ENGINE ON/OFF CYCLING IN A VEHICLE

(75) Inventors: Chihang Lin, Ann Arbor, MI (US);
Allen J. Lehmen, Howell, MI (US);
James B. Nicholson, Albion, MI (US);
Kevin J. Smith, Howell, MI (US)

(73) Assignee: GM Global Technology Operations LLC, Detroit, MI (US)

(*) Notice: Subject to any disclaimer, the term of this patent is extended or adjusted under 35 U.S.C. 154(b) by 481 days.

(21) Appl. No.: 12/557,918

(22) Filed: Sep. 11, 2009

(65) Prior Publication Data

US 2011/0066359 A1 Mar. 17, 2011

(51) Int. Cl.
*F02N 11/08* (2006.01)

(52) U.S. Cl. ............... 701/112; 123/179.3; 123/179.4

(58) Field of Classification Search ............ 701/101, 701/102, 106, 112, 113, 114, 115, 117, 118, 701/119, 103, 104; 123/481, 198 BD, 198 DC, 123/198 F, 198 D, 179.3, 179.4
See application file for complete search history.

(56) References Cited

U.S. PATENT DOCUMENTS

| | | | | |
|---|---|---|---|---|
| RE36,437 E | * | 12/1999 | Hanson et al. | 123/179.4 |
| 6,817,330 B1 | * | 11/2004 | Ogawa et al. | 123/179.4 |

FOREIGN PATENT DOCUMENTS

| | | | | |
|---|---|---|---|---|
| JP | 2000-205000 A | * | 7/2000 |
| JP | 2002-021690 A | * | 1/2002 |
| JP | 2006-207380 A | * | 8/2006 |
| JP | 2009-121290 A | * | 6/2009 |
| JP | 2009-137401 A | * | 6/2009 |
| JP | 2010-221853 A | * | 10/2010 |

OTHER PUBLICATIONS

Okamura et al., Engine Control Device, Jun. 4, 2009, JP 2009-121290A, English machine translation.*
Kajimoto et al., Automatic Stop/Start control device for engine, Aug. 10, 2006, JP 2006-207380 A, English machine translation.*

* cited by examiner

*Primary Examiner* — Stephen K Cronin
*Assistant Examiner* — Raza Najmuddin
(74) *Attorney, Agent, or Firm* — Quinn Law Group, PLLC

(57) ABSTRACT

A method is provided for optimizing the cycling frequency between engine on/off states in a vehicle having a controller and auto start/auto stop functionality. The method includes detecting an engine state cycling event, measuring a plurality of vehicle operating values, and using the controller to optimize the cycling frequency via at least one of: automatically adjusting an interval between an auto start event and an auto stop event when each of a first set of the vehicle operating values exceeds a corresponding threshold, and temporarily inhibiting the auto start/auto stop functionality when any value in a second set of the vehicle operating values falls outside of a hysteresis band created around the second set. A vehicle includes an engine and a controller having an algorithm for optimizing the cycling frequency between engine on/off states as set forth above.

10 Claims, 2 Drawing Sheets

METHOD AND APPARATUS FOR OPTIMIZING ENGINE ON/OFF CYCLING IN A VEHICLE

TECHNICAL FIELD

The present invention relates generally to electrical power flow control aboard a vehicle, and more particularly to a method and a system for optimizing the start/stop cycling frequency of an engine in a vehicle having auto stop/auto start functionality.

BACKGROUND OF THE INVENTION

Certain vehicle designs, such as hybrid electric vehicles (HEV), are able to selectively utilize different energy sources in order to optimize fuel efficiency. An HEV having a full hybrid powertrain can use either or both of an internal combustion engine and a high-voltage energy storage system (ESS) for propulsion. That is, a typical full HEV can be electrically propelled, usually immediately upon starting the HEV and during vehicle speeds up to a relatively low threshold speed. One or more high-voltage motor/generator units (MGU) may alternately draw power from and deliver power to the ESS as needed. Above the threshold speed, the engine can be started and engaged with a transmission to provide the required propulsive torque.

By way of contrast, the powertrain of a mild HEV typically lacks the capability of propelling the HEV via purely electrical means, but nevertheless retains certain key design features of the full HEV, e.g., the regenerative braking capability used for recharging the ESS using the MGU, as well as the capability of selectively shutting down or powering off the engine. The capability of an HEV to selectively shut off and restart the engine when the vehicle is at a standstill, and/or when operating in a stabilized low-speed drive mode, is of particular fuel-saving benefit relative to conventional idling vehicle designs.

SUMMARY OF THE INVENTION

Accordingly, a method is provided for optimizing engine start/stop cycling frequency in a vehicle having engine start/stop functionality as noted above. Such a vehicle may be configured as a hybrid electric vehicle (HEV) as described above, and may include a high-voltage motor generator unit (MGU) adapted to assist the automatic starting of the engine after an auto stop event. The method may be embodied in algorithmic form, and may be automatically executed via an onboard controller to optimize auto start/auto stop cycling frequency.

Within the scope of the invention, the algorithm may include two sub-processes, each approaching the engine start/stop cycling frequency optimization function in a different manner after first detecting a cycling event. In the first sub-process, the algorithm may make threshold comparisons between a first set of vehicle operating values, e.g., vehicle output speed and an accumulator value, with the algorithm automatically adjusting the time or interval between auto start/auto stop events based on these operating values. When the elapsed time since an immediately preceding event falls within a calibrated window, the algorithm may increase the accumulator value, and may set the accumulator value to zero when the duration of an engine-on or engine-off state exceeds a calibrated threshold.

In the second sub-process, which may be executed separately from the first sub-process or concurrently therewith, a dead band or a hysteresis band, as that term is well understood in the art, may be created around a second set of operating values, e.g., both an accelerator pedal position and the output speed. Auto stop functionality may be automatically inhibited or temporarily disabled or delayed if either value remains within the hysteresis band. The size of the hysteresis band may be adjusted based on how much time has elapsed since the last auto start event was executed.

According to one embodiment, the algorithm may include detecting a cycling event, i.e., sequential auto start/auto stop events, and then reducing the cycling frequency based in part on the current operating state of the vehicle. That is, the time between future or subsequent auto start and auto stop events may be automatically adjusted to a more acceptable value. The algorithm embodying the method may be executed by the controller to track the number of times or the duration since the engine has cycled from an engine-off state to engine-on state, or vice versa. Each time such a cycling event occurs outside of an allowable threshold cycling interval or window, an accumulator or other counter may be incremented. Additional time may be added between auto stop events based on the accumulator count and vehicle speed, or based on other suitable operating values.

In particular, a method or algorithm is provided herein for optimizing a frequency of a cycling event occurring between an auto start and an auto stop event in a vehicle. The algorithm includes detecting the cycling event, measuring a plurality of vehicle operating values, and at least one of a first sub-process and a second sub-process. The first sub-process automatically adjusts an interval between auto start/auto stop events when each of a first set of the values are determined to exceed corresponding thresholds, and the second sub-process inhibits auto stop functionality when any of a second set of the vehicle operating values falls outside of a hysteresis band around the second set of the values.

A vehicle is also provided herein, and includes an engine and a controller. The controller selectively shuts off or powers down the engine during an auto stop event, and commands a restart of the engine during an auto start event. The controller includes the algorithm described above, which is executed by the controller to optimize the cycling frequency between auto start/auto stop events. The algorithm detects the cycling event, measures the vehicle operating values, and adjusts an interval between a subsequent auto start/auto stop event when each of a first set of the values are greater than a corresponding threshold, and/or inhibits auto stop when any of a second set of the values falls outside of a hysteresis band around the second set of the values.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
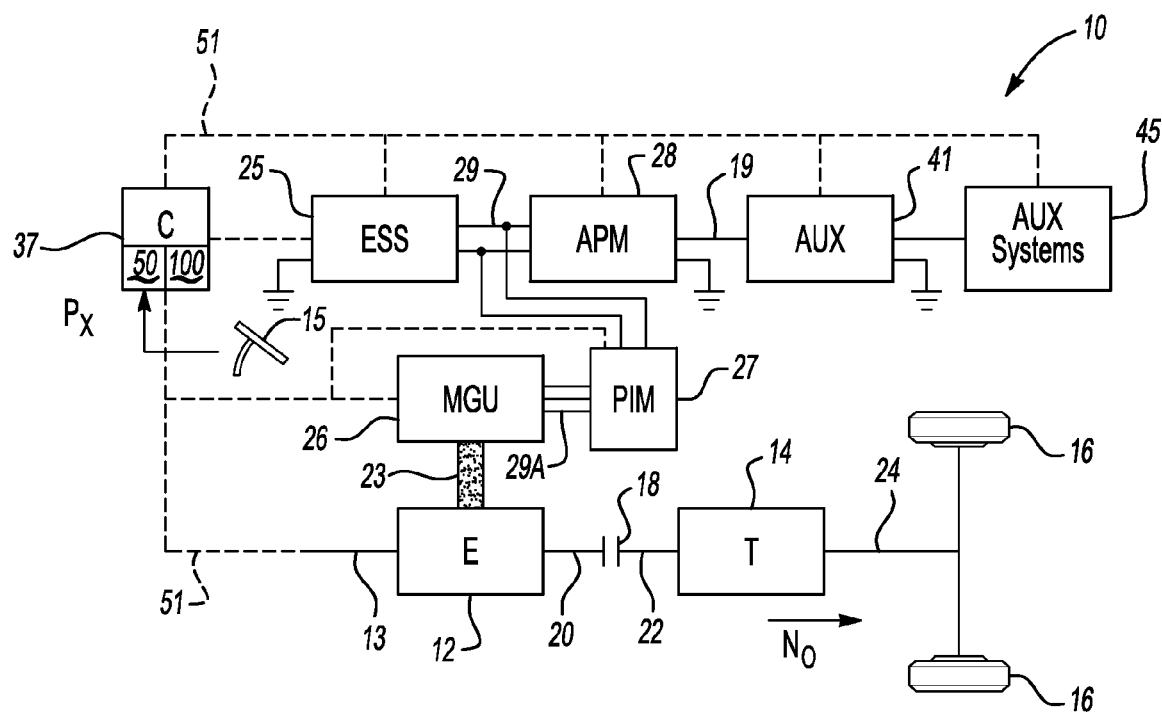
FIG. 1 is a schematic illustration of a vehicle having auto stop/auto start functionality and a controller with an auto stop/auto start cycling frequency optimization algorithm.

Referring to the drawings, wherein like reference numbers correspond to like or similar components throughout the several figures, FIG. 1 shows a vehicle 10 having auto stop/auto start functionality as explained above. The vehicle 10, which may be configured as a hybrid electric vehicle (HEV) as shown, includes a controller (C) 37 adapted for executing an auto stop event during vehicle idle or when operating below a threshold speed, and for executing an auto start event when engine propulsion is required. The controller 37 includes an algorithm 100 for optimizing the frequency of engine on/off state cycling, hereinafter referred to as the cycling frequency, with the algorithm explained below with reference to FIG. 2. The vehicle 10 includes an accelerator pedal 15 having a detectable pedal position (arrow $P_X$), with the pedal position transmitted to and/or read by the controller 37 as set forth below.

The vehicle 10 includes an internal combustion engine (E) 12 having a crankshaft 13 and an output member 20. The vehicle 10 includes a transmission (T) 14 having an input member 22 and an output member 24. Output member 20 of the engine 12 may be selectively connected to input member 22 via a torque transfer mechanism or clutch device 18. The transmission 14 may be configured as an electrically variable transmission (EVT) or any other suitable transmission capable of transmitting propulsive torque to a set of road wheels 16 via output member 24. Output member 24 of the transmission 14 rotates at an output speed ($N_O$) in response to an output speed request ultimately determined by the controller 37.

The vehicle 10 may include a high-voltage (HV) electric motor/generator unit (MGU) 26, such as a multi-phase electric machine of approximately 60 volts to approximately 300 volts or more depending on the design. MGU 26 is electrically connected to an HV battery or an energy storage system (ESS) 25 via an HV DC bus 29, a voltage inverter or power inverter module (PIM) 27, and an HV alternating current (AC) bus 29A. The ESS 25 may be selectively recharged using the MGU 26 when the MGU is operating in its capacity as a generator, for example by capturing energy during a regenerative braking event.

During normal operation of the vehicle 10, the MGU 26 may be used to selectively rotate a belt 23 of the engine 12, or another suitable portion thereof, thereby cranking the engine during an auto start event as set forth above. The vehicle 10 may also include an auxiliary power module (APM) 28, e.g., a DC-DC power converter, which is electrically connected to the ESS 25 via the DC bus 29. The APM 28 may also be electrically connected to the auxiliary battery 41, e.g., a 12-volt DC battery, via a low-voltage (LV) bus 19, and adapted for energizing one or more auxiliary systems 45 aboard the vehicle 10.

Still referring to FIG. 1, the controller 37 may be configured as a single or a distributed control device that is electrically connected to or otherwise in hard-wired or wireless communication with each of the engine 12, the MGU 26, the ESS 25, the APM 28, the PIM 27, and the auxiliary battery 41 via a control channel 51, as illustrated by dashed lines. Control channel 51 may include any required transfer conductors, e.g., a hard-wired or wireless control link(s) or path(s) suitable for transmitting and receiving the necessary electrical control signals for proper power flow control and coordination aboard the vehicle 10. The controller 37 may include such control modules and capabilities as might be necessary to execute all required power flow control functionality aboard the vehicle 10 in the desired manner.

The controller 37 may be configured as a general purpose digital computer generally comprising a counter or accumulator 50, a microprocessor or central processing unit, read only memory (ROM), random access memory (RAM), electrically-erasable programmable read only memory (EEPROM), high speed clock, analog to digital (A/D) and digital to analog (D/A) circuitry, and input/output circuitry and devices (I/O), as well as appropriate signal conditioning and buffer circuitry. Any algorithms resident in the controller 37 or accessible thereby, including the auto stop/auto start cycling frequency optimizing algorithm 100 in accordance with the invention as described below with reference to FIG. 2, can be stored in ROM and executed to provide the respective functionality.

As used herein, the term auto stop refers to the ability of the vehicle 10 to selectively shut down or power off the engine 12 whenever the HEV is idle or at a standstill, such as while waiting at an intersection, in low-speed traffic, or when otherwise determined by the control logic resident within the controller 37. In this manner, the vehicle 10 is able to minimize idle fuel consumption. After an auto stop event, the MGU 26 may be used to rapidly restart the engine 12, with this process referred to herein as an auto start event.

Within the scope of the invention, the controller 37 includes or has access to the algorithm 100 mentioned above and described below in detail with reference to FIG. 2. The controller 37 executes the algorithm 100 to automatically monitor and adjust the auto stop/auto start cycling frequency.

Figure 2:
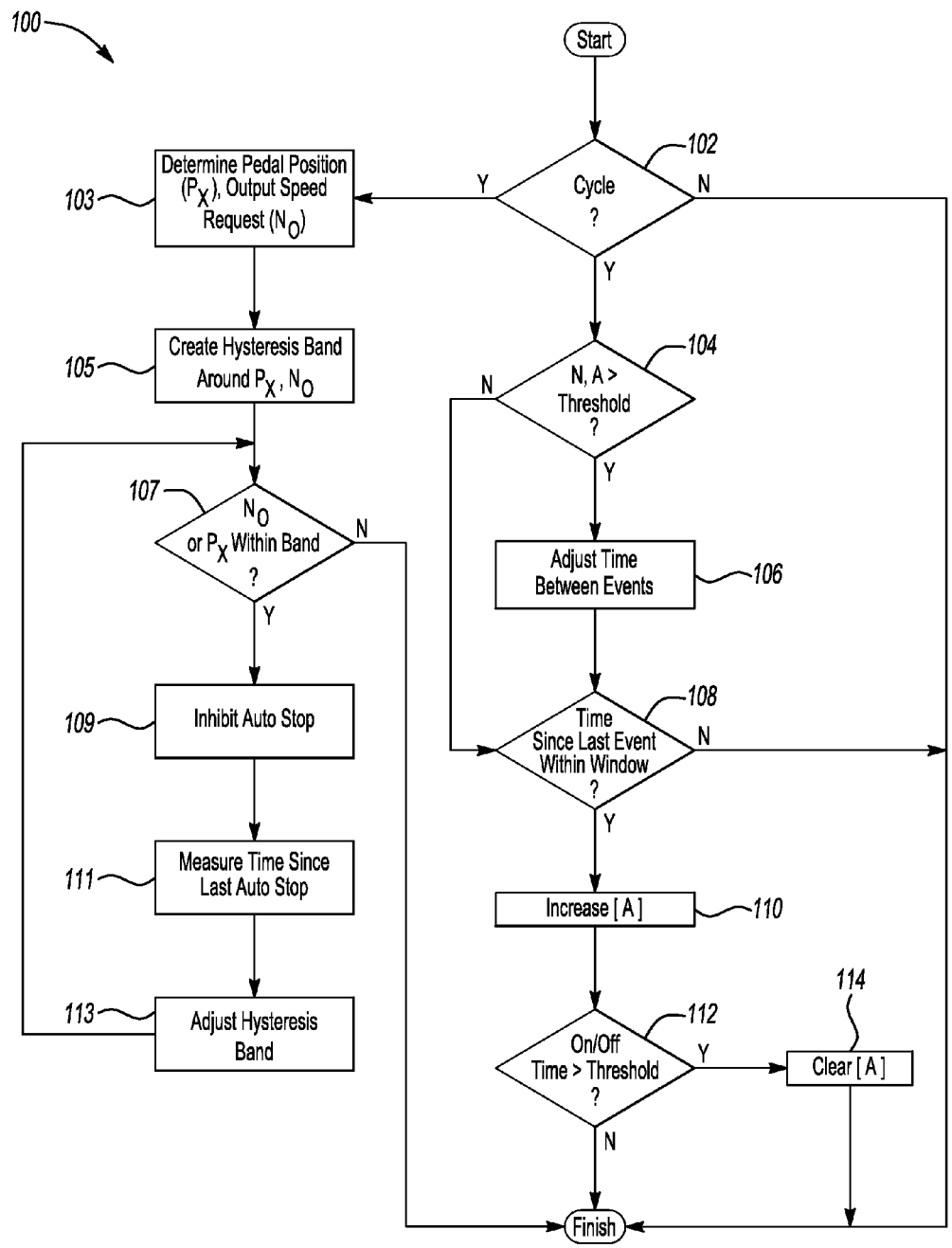
FIG. 2 is a graphical flow chart describing the algorithm usable with the vehicle of FIG. 1.

Referring to FIG. 2, the algorithm 100 may be read in conjunction with the structure shown in FIG. 1 and described above. The algorithm 100 begins with steps 102 and 103 concurrently in one embodiment. In another embodiment, steps 102 and 103 may be executed individually as two different sub-processes as determined by the controller 37, or optionally by an operator of the vehicle 10 if so configured. As such, the even steps outlined hereinafter may be referred to as the first sub-process of algorithm 100, and the odd steps as the second sub-process of the same algorithm.

At step 102, it is determined whether an auto stop/auto start cycling event has occurred. Within the scope of the invention, such a cycling event occurs when the engine 12 transitions from an engine-on state to an engine-off state, or vice versa. If such a cycling event is affirmatively detected or its presence otherwise determined, the algorithm 100 proceeds to step 104, otherwise the algorithm is finished.

At step 103, the algorithm 100 determines the effective pedal position ($P_X$) of the accelerator pedal 15, and the corresponding vehicle output speed ($N_O$). Once determined, whether via direct measurement, calculation, or otherwise, the algorithm 100 proceeds to step 105.

At step 104, the vehicle output speed ($N_O$) and a value [A] of the counter or accumulator 50 are compared to corresponding calibrated threshold values. If the vehicle output speed ($N_O$) and the accumulator value [A] exceed their corresponding threshold values, the algorithm 100 proceeds to step 106, otherwise it proceeds to step 108.

At step 105, the algorithm 100 creates a dead band or hysteresis box or band around the values of the pedal position ($P_X$) and vehicle output speed ($N_O$) determined at step 103, and then it proceeds to step 107.

At step 106, the algorithm 100 modifies the time between auto start/auto stop events. The amount of the modification may vary depending on the variance of either or both of the values of the vehicle output speed ($N_O$) and the accumulator value (A) from their corresponding thresholds. That is, given a low vehicle output speed ($N_O$) and a high accumulator value [A], the time or interval between immediately subsequent or future auto start/auto stop events may be increased a relatively large amount, while given a high vehicle output speed ($N_O$) and a low accumulator value [A] the same time or interval may be increased a relatively small amount. The algorithm 100 then proceeds to step 108.

At step 107, the algorithm 100 determines whether the corresponding value of either of the pedal position ($P_X$) or the vehicle output speed ($N_O$) is within the hysteresis band created at step 105. If so, the algorithm 100 proceeds to step 109, and is otherwise finished.

At step 108, the algorithm 100 determines the amount of elapsed time that has elapsed since the last auto stop/auto start event, e.g., by referencing a timer, and then compares this value to a threshold interval or window. The window may be relatively short in duration, approximately equal to duration considered reasonable or unobtrusive by a typical driver. If the elapsed time falls within the window, the algorithm 100 proceeds to step 110, otherwise the algorithm is finished.

At step 109, auto stop capability may be temporality prevented or inhibited, e.g., during a stabilized low-speed drive mode. The algorithm 100 then proceeds to step 111. Step 109 may allow a higher opportunity cost to be applied to the engine-off state when the vehicle output speed ($N_O$) and effective pedal position ($P_X$) determined at step 103 are within the calibrated window of step 107.

At step 110, the algorithm 100 increments the accumulator value and proceeds to step 112, having determined at step 108 that the time since the last auto stop event falls within too short of a time period relative to the threshold interval or window.

At step 111, the algorithm 100 measures the elapsed time since the last auto stop event, e.g., by referencing a timer, and then proceeds to step 113.

At step 112, the algorithm 100 determines whether the duration that the engine 12 has been in an engine-on state or in an engine-off state exceeds a calibrated threshold. The duration may be the same or different for the two engine states, i.e., on and off, depending on the design of the vehicle 10. If the engine 12 has been on or off for longer than the calibrated threshold(s), the algorithm 100 proceeds to step 114, and is otherwise finished.

At step 113, the algorithm 100 automatically adjusts the hysteresis band previously created at step 105 based on the elapsed time since the last auto stop event (see step 111). For example, the size of the hysteresis box may be automatically narrowed if a threshold amount of time has passed since the last auto start. The algorithm 100 then returns to step 107 as set forth above.

At step 114, the algorithm 100 sets the accumulator value (A) to zero, i.e., resets or zeroes the accumulator 50. The algorithm 100 is then finished. When the algorithm 100 resumes with step 102, it may do so with a zero value. In this manner, the algorithm 100 specifically detects heavy auto start/auto stop cycling and then attempts to reduce this frequency in order to improve performance of the vehicle 10, while at the same time avoiding accumulation counts under normal driving conditions.

As will be understood by those of ordinary skill in the art, and as noted elsewhere above, the algorithm 100 may be executed in whole or in part depending on the design of the vehicle 10. For example, the evenly numbered steps 102-114 may be executed as a first sub-process to provide an engine cycle accumulator mode. In this mode, the algorithm 100 examines the number of times the engine 12 cycles from an engine-on to an engine-off state, or vice versa. Cycles are only accumulated if the engine start occurs within a short period of time after the engine stop, i.e., rapid cycling of the type experienced in relatively heavy traffic.

Each time a specific cycling event occurs, accumulator 50 is incremented as noted above. Based on the count or value (A) of the accumulator 50 and the output speed of the HEV 10, additional time may be added to inhibit an auto stop event, and to reduce auto start cycling in traffic. The accumulator 50 is then cleared (see step 114) when the engine 12 is in an off or on state for an extended period of time. In this manner, the algorithm 100 in steps 102-114 may be used to detect heavy auto start/auto stop cycling, with the algorithm reducing the frequency of such cycling to improve drivability and avoid accumulation counts under normal driving conditions.

Likewise, the odd steps 103-113 may be executed as a second sub-process to provide a stability-based inhibit logic mode. In this mode, the algorithm 100 creates boundaries in the form of a hysteresis band or box around the pedal position (Px) and the vehicle output speed ($N_O$). The longer the engine 12 runs, the smaller the hysteresis box may become, and the more likely the engine has stabilized.

Engine run time may be monitored, and a multiplier may be added to the amount of hysteresis for both the pedal position ($P_X$) and the vehicle output speed ($N_O$). Cycling may be reduced when the pedal position ($P_X$) or the vehicle output speed ($N_O$) are insufficiently varied. An example of such cycling may occur when driving the vehicle 10 around a low-speed sweeping corner or curve, where the driver of the vehicle does not substantially tip out the throttle, but the engine 12 may nevertheless cycle off and on due to the slight reduction in pedal request. The algorithm 100 may be calibrated to avoid such a cycling event.

While the best modes for carrying out the invention have been described in detail, those familiar with the art to which this invention relates will recognize various alternative designs and embodiments for practicing the invention within the scope of the appended claims.

The invention claimed is:

1. A method for optimizing a cycling frequency between engine on/off states in a vehicle having a controller, an accumulator, a brake pedal, and auto start/auto stop functionality, the method comprising:

detecting an engine state cycling event;

measuring a position of the brake pedal, an output speed of the vehicle, and a value of the accumulator;

incrementing the accumulator value via the controller when an elapsed time since an immediately preceding engine state cycling event falls within a calibrated window;

creating a hysteresis band around the pedal position and the output speed; and using the controller to optimize the cycling frequency, including:

comparing the output speed and the accumulator value to corresponding thresholds;

automatically adjusting an interval between an auto start event and an auto stop event of the vehicle when each of the output speed and the accumulator value exceeds a corresponding threshold, wherein the amount of adjustment depends on the variance of the output speed and the accumulator value from their respective thresholds; and temporarily inhibiting the auto start/auto stop functionality of the vehicle when at least one of the pedal position and the output speed remains within the hysteresis band.

2. The method of claim 1, including using the controller to optimize the cycling frequency via automatically adjusting the interval, wherein the first set of the vehicle values includes an accumulator value and an output speed of the vehicle, the method further comprising:

increasing the accumulator value when the elapsed time exceeds a threshold elapsed time, and when each of the output speed and the accumulator value do not exceed their corresponding thresholds; and automatically adjusting an interval between a subsequent auto start event and a subsequent auto stop event when each of the output speed and the accumulator value exceed their corresponding thresholds.

3. The method of claim 1, the method further comprising:
setting the accumulator value to zero when one of an elapsed time of an engine-on state since an immediately prior engine state cycling event and an elapsed time of an engine-off state since an immediately prior engine state cycling event exceeds a calibrated elapsed time.

4. The method of claim 1, the method further comprising:
automatically adjusting the size of the hysteresis band as a function of the cycling frequency.

5. A method for optimizing the cycling frequency between engine states in a vehicle having a controller and auto start/auto stop functionality, the method comprising:
detecting the engine state cycling event;
measuring a plurality of vehicle operating values including a value of an accumulator that is incremented by the controller when an elapsed time since an immediately preceding engine state cycling event falls within a calibrated window, a vehicle output speed, and a pedal position of an accelerator pedal of the vehicle; and
using the controller to optimize the cycling frequency via each of:
  automatically adjusting an interval between an auto start event and an auto stop event of the vehicle as a function of a variance between each of the accumulator value and the output speed and a corresponding threshold when the output speed and the accumulator value each exceeds its corresponding threshold;
  inhibiting the auto stop/auto start functionality of the vehicle when the values of either the output speed and the pedal position falls outside of a hysteresis band around the values of the output speed and the pedal position; and
  adjusting the size of the hysteresis band based on how much time has elapsed since the last auto start event.

6. The method of claim 5, further comprising:
setting the accumulator value to zero when one of an elapsed engine-on time and an elapsed engine-off time since the immediately prior cycling event exceeds a calibrated elapsed time.

7. A vehicle having auto stop/auto start functionality, and comprising:
an engine; and
a controller configured to selectively shut off the engine during an auto stop event, and to command a restart of the engine during an auto start event;
wherein the controller is further configured to optimize a cycling frequency between engine on/off states by:
  detecting an engine state cycling event;
  measuring a plurality of vehicle operating values, including a value of an accumulator that is incremented by the controller only when an elapsed time since an immediately preceding engine state cycling event falls within a calibrated window, a vehicle output speed, and a pedal position of an accelerator pedal of the vehicle; and
  optimizing the cycling frequency by:
    automatically adjusting an interval between an auto start event and an auto stop event when each of the accumulator value and the vehicle speed is greater than a corresponding threshold; and
    temporarily inhibiting the auto start/auto stop functionality of the vehicle when at least one of the pedal position and the vehicle output speed remains within a hysteresis band created around the pedal position and vehicle output speed.

8. The vehicle of claim 7, wherein the controller is further configured to:
increment the accumulator value when the elapsed time exceeds a threshold elapsed time and the output speed and the accumulator value both do not exceed a corresponding threshold; and
adjust an interval between a subsequent auto start event and a subsequent auto stop event only when the output speed and the accumulator value each exceeds a corresponding threshold.

9. The vehicle of claim 7, wherein the controller is further configured to:
set the accumulator value to zero when at least one of an elapsed engine-on time and an elapsed engine-off time since an immediately prior cycling event exceeds a calibrated elapsed time.

10. The vehicle of claim 7, wherein the controller is further configured to automatically adjust the size of the hysteresis band as a function of the cycling frequency.

* * * * *